(12) United States Patent
Yamazaki (10) Patent No.: US 6,508,510 B2
(45) Date of Patent: Jan. 21, 2003

(54) CHILD CAR SEAT

(75) Inventor: Kojiro Yamazaki, Urawa (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 09/741,428

(22) Filed: Dec. 21, 2000

(65) Prior Publication Data

US 2001/0004163 A1 Jun. 21, 2001

(30) Foreign Application Priority Data

Dec. 21, 1999 (JP) .......................................... 11-362980

(51) Int. Cl.[7] ................................................ A47D 1/10
(52) U.S. Cl. .................................. 297/250.1; 297/250.1
(58) Field of Search ..................... 297/256.16, 250.1, 297/468

(56) References Cited

U.S. PATENT DOCUMENTS 5,671,971 A * 9/1997 Koyanagi et al. ......... 297/250.1
5,839,789 A * 11/1998 Koledin ............... 297/250.1 X
6,152,528 A * 11/2000 Van Montfort .......... 297/250.1

FOREIGN PATENT DOCUMENTS

| DE | 197 22 096 | 12/1998 |
|---|---|---|
| EP | 0 323 334 | 7/1989 |
| EP | 0 816 161 | 1/1998 |

* cited by examiner

*Primary Examiner*—Peter M. Cuomo
*Assistant Examiner*—Rodney B. White
(74) *Attorney, Agent, or Firm*—Wenderoth, Lind & Ponack, L.L.P.

(57) ABSTRACT

A child car seat is capable of being easily set on a passenger seat (7) of a vehicle and of simply and sufficiently being tightening a seat belt (4). The child car seat to be fixedly held on a passenger seat (7) of a vehicle by a seat belt (4) has a seat belt fastening mechanism (20) for fastening a diagonal section (4*a*) of the seat belt (4), a seat belt tightening mechanism (11) for deflecting a lap section (4*b*) of a fixed length of the seat belt (4), and a locking mechanism (15) for locking the seat belt tightening mechanism (11). The lap section (4*b*) of the seat belt (4) extended across a base (10) is deflected and is kept in a deflected state to tighten the seat belt (4).

12 Claims, 8 Drawing Sheets

CHILD CAR SEAT

BACKGROUND OF THE INVENTION

1. Field of the Invention

The present invention relates to a child car seat and, more particularly, to a child car seat to be mounted on a passenger seat of a vehicle and fastened to the passenger seat by a seat belt.

2. Description of Related Art

Figure 9:
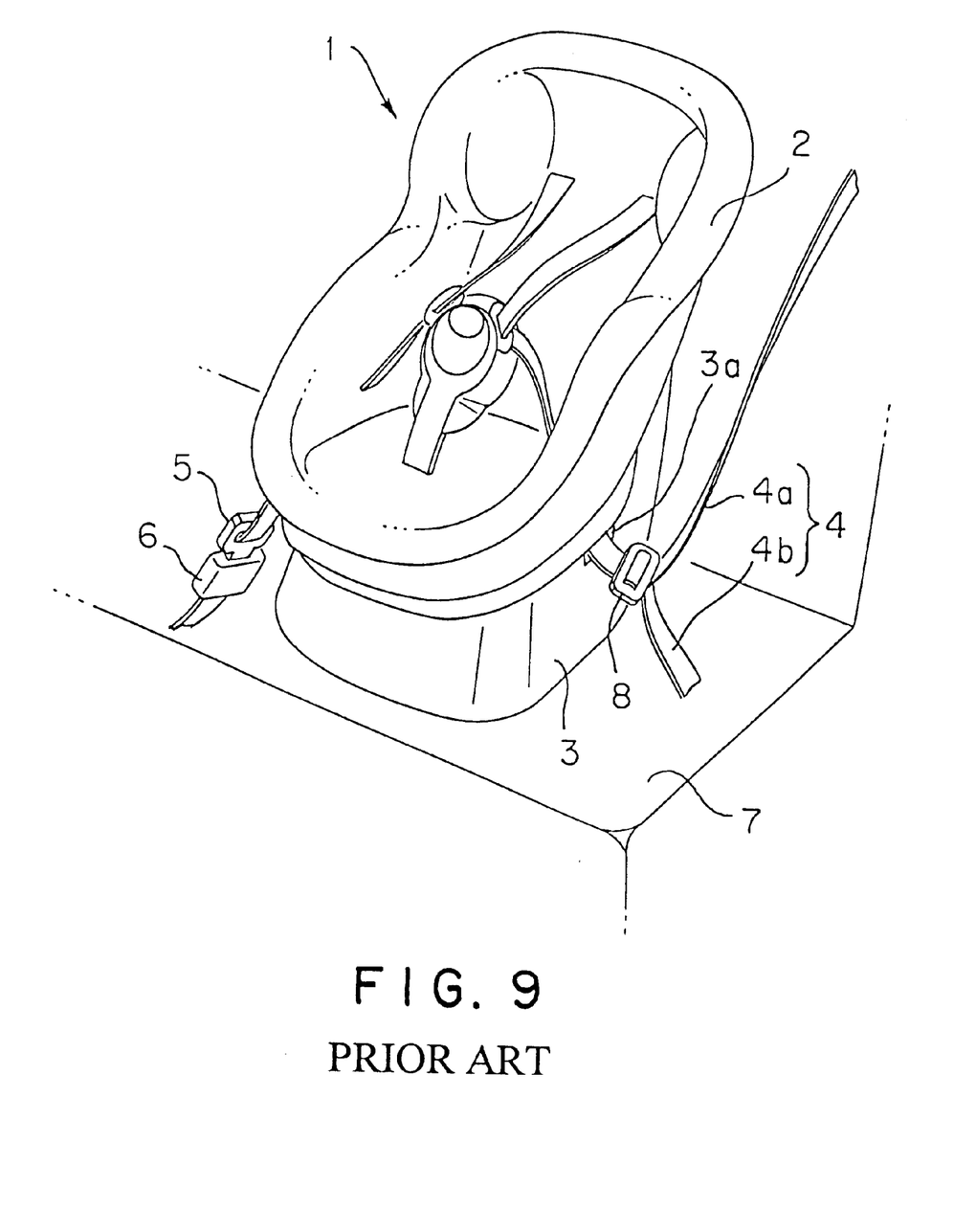
FIG. 9 is a perspective view of a conventional child car seat fastened to a passenger seat by a seat belt.

Referring to FIG. 9, a known child car seat 1 has a seat body 2 and a base 3 supporting the seat body 2 thereon. The seat body 2 is formed integrally with the base 3 or is supported on the base 3 so as to be turnable or tiltable relative to the base 3.

A seat belt 4 of the vehicle is passed through a belt hole 3a formed in the base 3, and a tongue plate 5 connected to the seat belt 4 is engaged with a latch 6 anchored to the floor of the vehicle to hold the child car seat 1 fixedly on a passenger seat 7 of the vehicle.

When fastening the child car seat 1 to the passenger seat 7 by a lap-and-diagonal seat belt 4, a belt section (diagonal section) 4a extending from the tongue plate 5 is connected to a retractor, not shown, and hence the diagonal section 4a tends to become loose. Therefore, when the lap-and-diagonal seat belt 4 is used, the diagonal section 4a and a belt section (lap section) 4b extending from the tongue plate 5 are fastened together by a clip 8.

A method of setting the child car seat 1 on the passenger seat 7 requires the diagonal section 4a and the lap section 4b to be tensioned sufficiently when fastening together the diagonal section 4a and the lap section 4b by the clip 8. When setting the child car seat 1 on the passenger seat 7, the diagonal section 4a and the lap section 4b are tensioned by attaching the clip 8 to the diagonal section 4a and the lap section 4b while the child car seat 1 is pressed firmly against the passenger seat 7 and the diagonal section 4a is pulled. However, such child car seat mounting work requires the simultaneous performance of two actions, one for pressing the child car seat 1 against the passenger seat 7 and one for pulling the diagonal section 4a. This which is very troublesome and requires both physical strength and skill.

SUMMARY OF THE INVENTION

It is an object of the present invention to provide a child car seat that is easy to set on a passenger seat of a vehicle and allows for a seat belt for fastening the child car seat in place to be simply and sufficiently tensioned.

According to the present invention, a child car seat to be set and fixedly held on a passenger seat of a vehicle by a seat belt extended between a retractor and a fixed member, comprises a base to be set on the passenger seat; a seat body to be set on the base; a seat belt fastening mechanism supported on the base for fastening a predetermined portion of the seat belt extending from the retractor; a seat belt tightening mechanism supported on the base for tightening a section extending between the fixed member and the predetermined portion of the seat belt by deflecting the same section toward the passenger seat; and a locking mechanism for locking the seat belt tightening mechanism to keep tight the seat belt tightened by the seat belt tightening mechanism.

Preferably, the seat belt fastening mechanism includes a clip, set on the base, that is capable of clipping a portion of the seat belt.

Preferably, the seat belt tightening mechanism includes a shaft supported on the base and a lever having a base end supported on the shaft, and is capable of tightening the seat belt by deflecting the seat belt by turning the lever on the shaft.

Alternatively, the seat belt tightening mechanism includes a support arm projecting from the base, and a screw provided in the support arm, and is capable of tightening the seat belt by deflecting the seat belt by propelling or turning the screw.

Preferably, the locking mechanism is capable of locking the seat belt tightening mechanism at one of a plurality of positions respectively corresponding to deflections of the seat belt deflected by the seat belt tightening mechanism.

Preferably, the seat belt has a diagonal section extending from a tongue plate, to be latched at a predetermined position on the vehicle, to the retractor, and a lap section extending from the tongue plate to the fixed member. The diagonal section is fastened by the seat belt fastening mechanism, and the lap section is tightened by the seat belt tightening mechanism.

According to the present invention, the seat belt of the vehicle is put on the base, the length of a section of the seat belt is fixed by the seat belt fastening mechanism, and then the seat belt can be tightened by the seat belt tightening mechanism. Thus, work for setting the child car seat on the passenger seat of the vehicle does not include the simultaneous performance of two actions for keeping the length of the seat belt fixed and tightening the seat belt. Consequently, the seat belt can be easily put on the child car seat, and the seat belt used for fastening the child car seat to the passenger seat of the vehicle can be sufficiently tightened.

According to the present invention, the clip set on the base may be used as the seat belt fastening mechanism and hence there might be no possibility of the clip being lost. When the clip is attached to the back part of the base, both hands can be used for engaging the seat with the clip at a high position, which facilitates the work required for fastening the seat belt.

According to the present invention, the seat belt tightening mechanism may include the lever having the base end supported on the shaft supported on the base, and the lever may be turned on the shaft to press the seat belt by the free end of the lever. Thus, a sufficiently high tensile force can be exerted on the seat belt.

According to the present invention, the seat belt tightening mechanism may include the screw supported on the support arm projecting from the base, and the screw may be propelled or turned to press the seat belt. Thus, an optimum tensile force can be optionally selected.

According to the present invention, the locking mechanism is capable of locking the seat belt tightening mechanism at an optional one of a plurality of positions respectively corresponding to deflections of the seat belt pressed by the seat belt tightening mechanism, so that an optimum tensile force can be optionally selected.

DESCRIPTION OF THE PREFERRED EMBODIMENTS

A child car seat in a preferred embodiment of the present invention will be described with reference to FIGS. 1 to 6.

Figure 1:
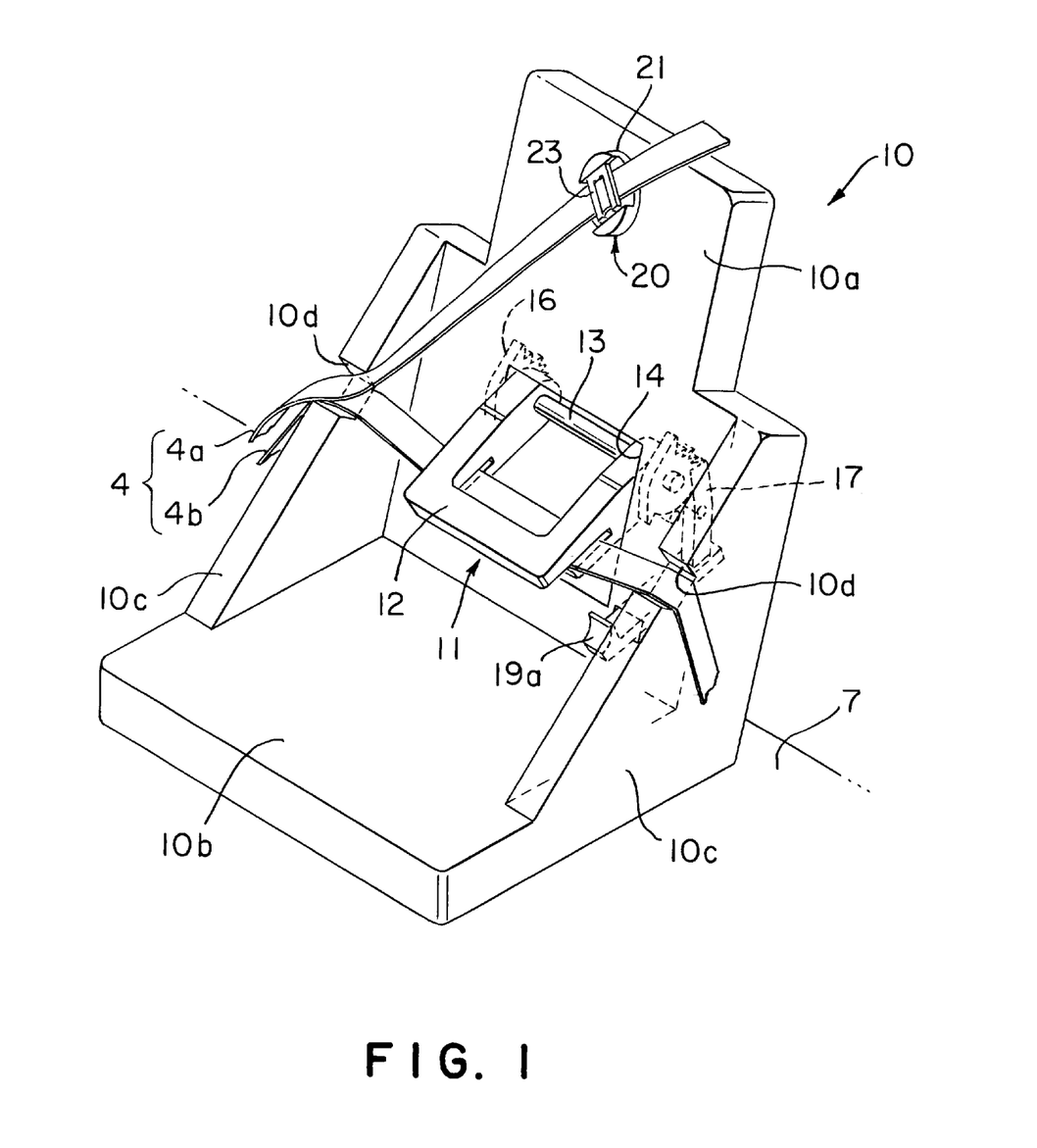
FIG. 1 is a schematic perspective view of a child car seat in a preferred embodiment of the present invention.

Referring to FIG. 1, a child car seat in a preferred embodiment of the present invention includes a base 10 to be set on a passenger seat 7 of a vehicle, and a seat body, not shown, to be set on the base 10. The base 10 has a back plate 10a, a bottom plate 10b and side plates 10c and 10c extended between the sides of the back plate 10a and the bottom plate 10b, respectively. Recesses 10d and 10d are formed in inclined surfaces of the side plates 10c and 10c, respectively. The seat body may be similar to that of the conventional child car seat as shown in FIG. 9 and may be attached to the base 10 by a method similar to a conventional method.

Figure 5:
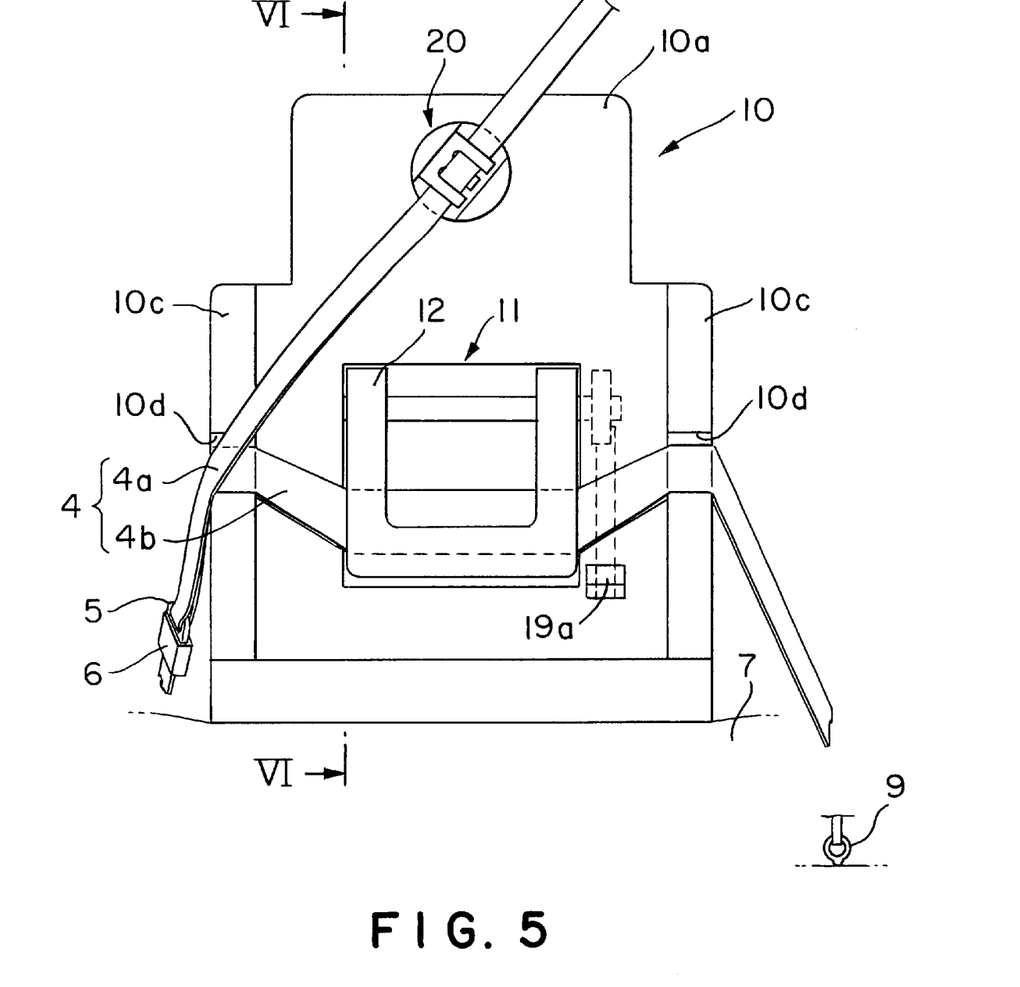
FIG. 5 is a front elevational view of the child car seat shown in FIG. 1, in which a seat belt is put on a base included in the child car seat.

The base 10 is fastened to the passenger seat 7 by a lap-and-diagonal seat belt 4. The seat belt 4 has a diagonal section 4a extending between a tongue plate 5 (FIG. 5) to be engaged with a latch 6 (FIG. 5) connected to the floor of the vehicle and a retractor (not shown), and a lap section 4b extending between the tongue plate 5 (FIG. 5) and an anchor (fixed member) 9 (FIG. 5).

A seat belt tightening mechanism 11 is set on the back plate 10a of the base 10. The seat belt tightening mechanism 11 includes a lever 12 for pressing the lap section 4b of the seat belt 4 toward the passenger seat 7.

The lever 12 has a base end supported on a shaft 13 supported on the side walls of an opening 14 formed in the back plate 10a. The lever 12 is turned on the shaft 13 to press the lap section 4b of the seat belt 4 to tighten the same. The lever 12 is biased constantly upwardly by a spring, not shown.

Figure 2:
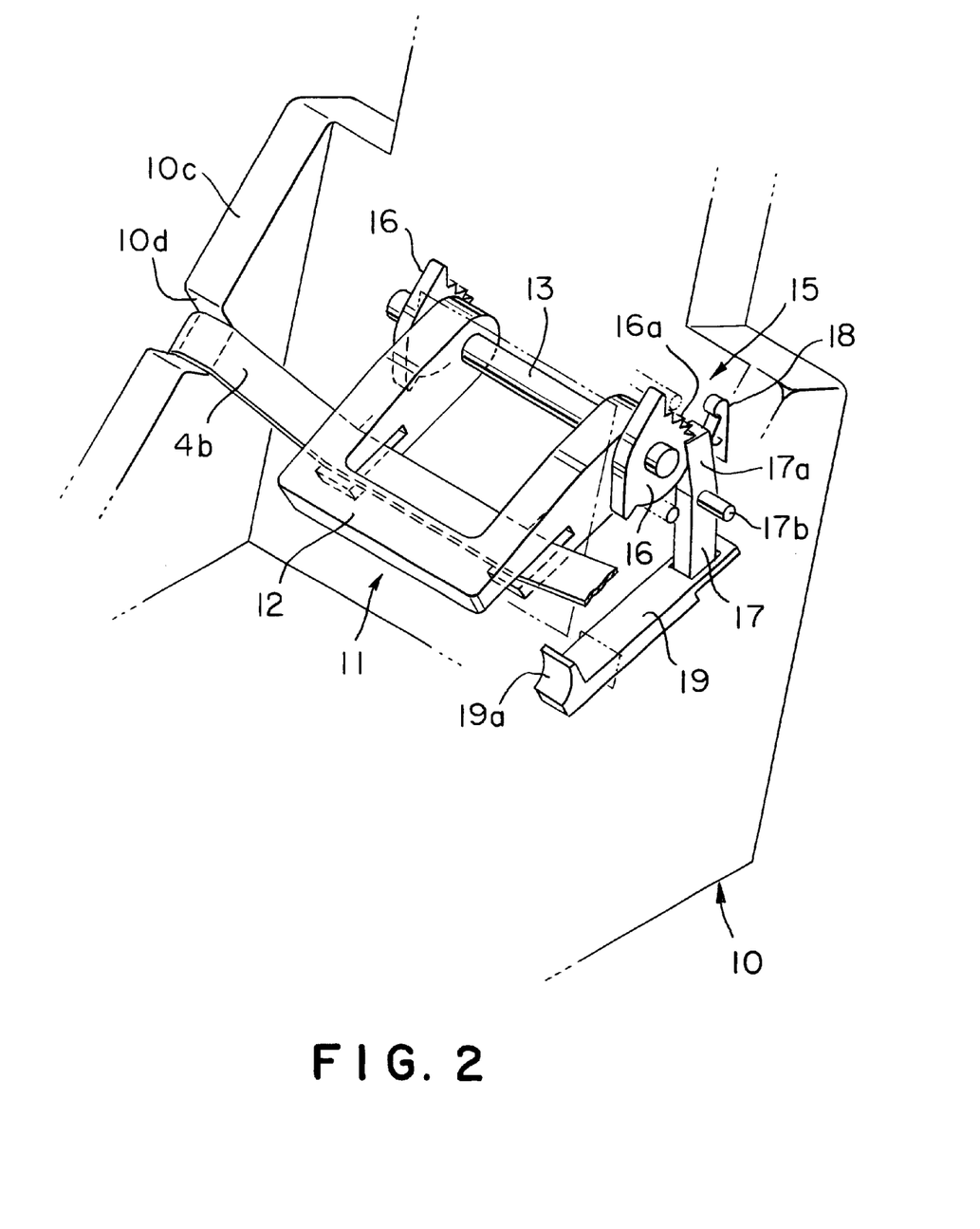
FIG. 2 is a perspective view of a seat belt tightening mechanism and a locking mechanism included in the child car seat shown in FIG. 1.

Referring to FIG. 2, a locking mechanism 15 for locking the lever 12 is disposed near the base end of the lever 12 to keep the lap section 4b of the seat belt 4 tightened. The locking mechanism 15 has a toothed disk 16 provided with a plurality of teeth 16a on its circumference, and fixedly combined with the lever 12. The locking mechanism 15 has a retaining pawl 17 having a working end 17a. The retaining pawl 17 is supported for turning on the back plate 10a of the base 10 by a pin 17b. The retaining pawl 17 is biased toward the toothed disk 16 by a plate spring 18 so that the working end 17a of the retaining pawl 17 engages the teeth 16a of the toothed disk 16 selectively. Thus, the lever 12 can be locked at a desired one of a plurality of positions respectively corresponding to deflections of the lap section 4b of the seat belt 4.

An operating rod 19 is supported for sliding on the base 10. The operating rod 19 has one end engaging the retaining pawl 17 and the other end provided with a knob 19a. The knob 19a of the operating rod 19 projects forward through an opening formed in the back plate 10a of the base 10 as shown in FIG. 1. The knob 19a is pulled forward to disengage the working end 17a of the retaining pawl 17 from the tooth 16a of the toothed disk 16 by tuning the retaining pawl 17 on the pin 17b.

Figure 4:
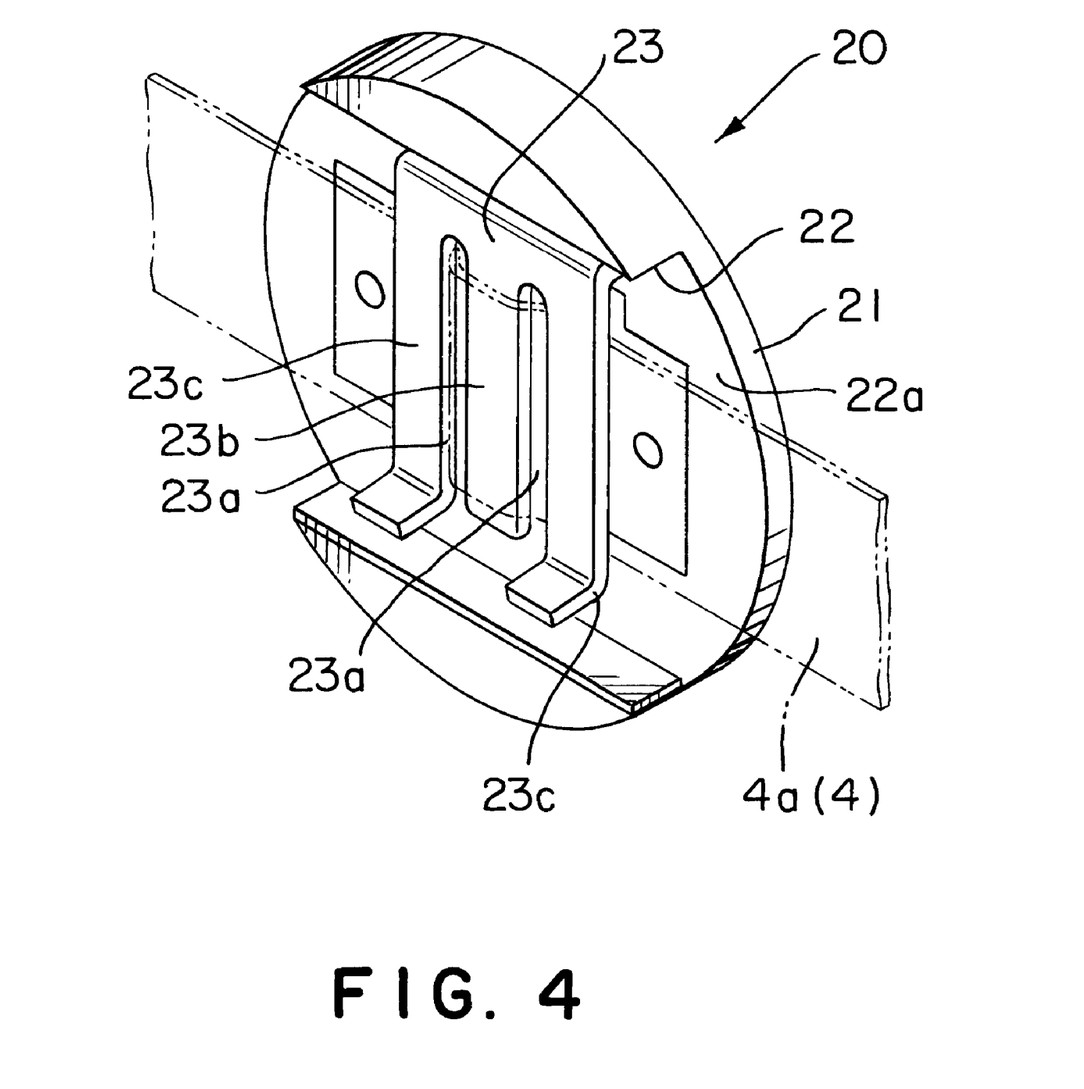
FIG. 4 is a perspective view of a seat belt fastening mechanism included in the child car seat shown in FIG. 1.

A seat belt fastening mechanism 20 is set on the back plate 10a of the base 10 as shown in FIG. 1. The seat belt fastening mechanism 20 has a rotary disk 21. As shown in FIG. 4, the rotary disk 21 is provided with a slot 22, through which the diagonal section 4a of the seat belt 4 is extended. A clip 23 is fastened to the bottom surface 22a of the slot 22. The clip 23 is formed by bending a plate in a shape having a U-shaped cross section. The clip 23 has a back wall fastened to the bottom surface 22a of the slot 22, and a front wall provided with two slits 23a and 23a dividing the front wall into a middle portion 23b and two side portions 23c and 23c lying on the opposite sides of the middle portion 23b, respectively. The lower end of the middle section 23b is inserted into one of the side walls of the slot 22. The lower ends of the side portions 23c and 23c are free.

The diagonal section 4a of the seat belt 4 is tucked in spaces under the side portions 23c and 23c so that the diagonal section 4a is buckled and extends under the side portions 23c and 23c and over the middle portion 23b as indicated by two-dot chain lines in FIG. 4.

A procedure for fixedly setting the child car seat on the passenger seat 7 of the vehicle will be described hereinafter.

Step 1: The base 10 is set on the passenger seat 7 of the vehicle.

Step 2: The tongue plate 5 of the seat belt 4 is engaged with the latch 6 with the lap section 4b of the seat belt 4 extended under the lever 12 of the seat belt tightening mechanism 11.

Step 3: The diagonal section 4a of the seat belt 4 is pulled toward the tongue plate 5 and is engaged with the clip 23 of the seat belt fastening mechanism 20.

Figure 6:
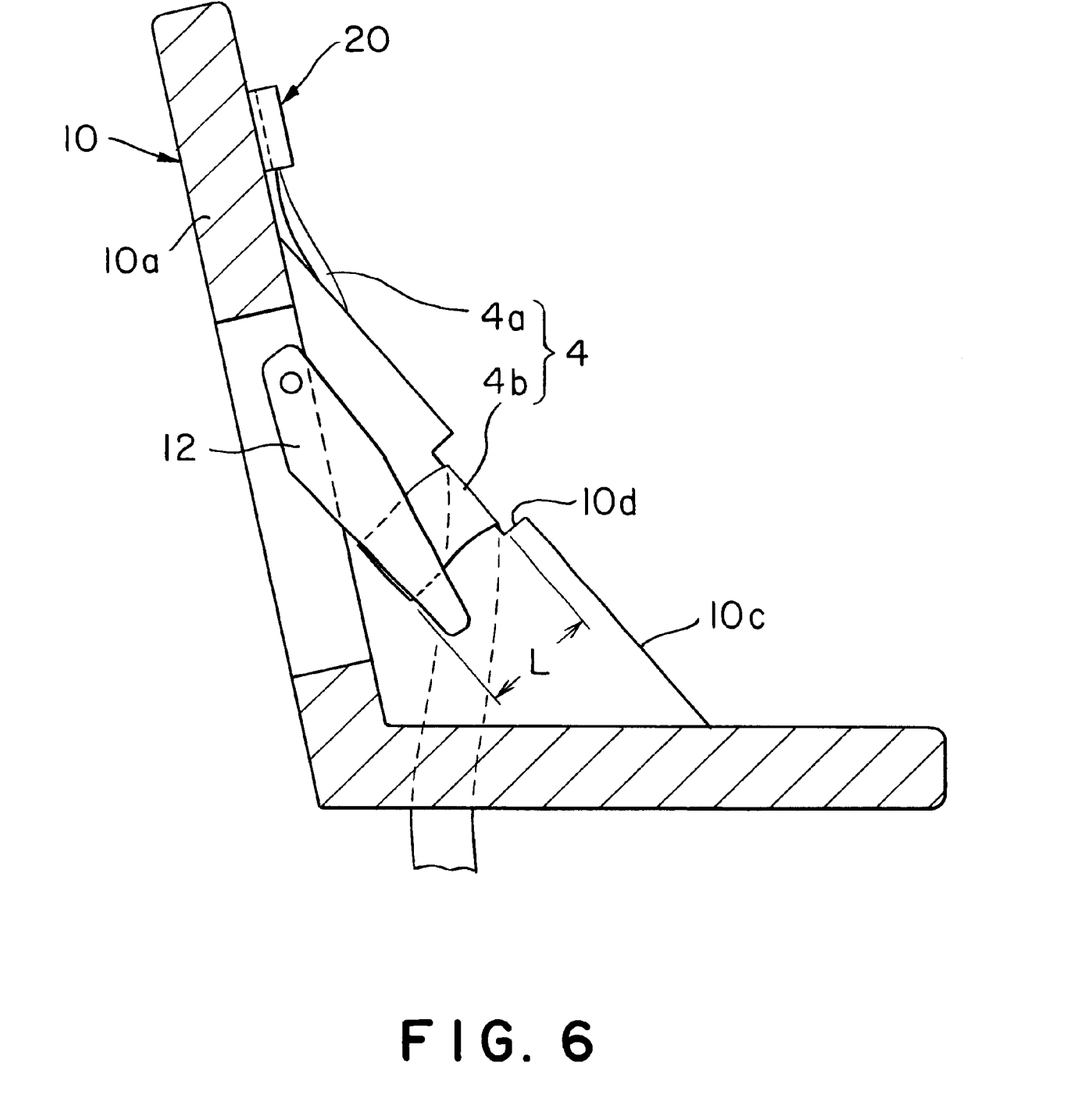
FIG. 6 is a sectional view taken along line VI—VI in FIG. 5.

Step 4: The lever 12 of the seat belt tightening mechanism 11 is turned downwardly to deflect the lap section 4b downwardly. Consequently, the lap section 4b extending between the recesses 10d and 10d of the base 10 is deflected downwardly by a distance L as shown in FIG. 6. Since the seat belt 4 is held fixedly by the anchor 9 and the seat belt fastening mechanism 20, the length of the lap section 4a extending between the recesses 10d and 10d of the base 10 is fixed. Therefore, the child car seat sinks into the passenger seat 7 by a depth corresponding to the distance L, and the lap section 4b is tightened when the lap section 4b is depressed by the distance L.

This tight state of the seat belt 4 is maintained by the locking mechanism 15 that locks the lever 12.

Figure 3:
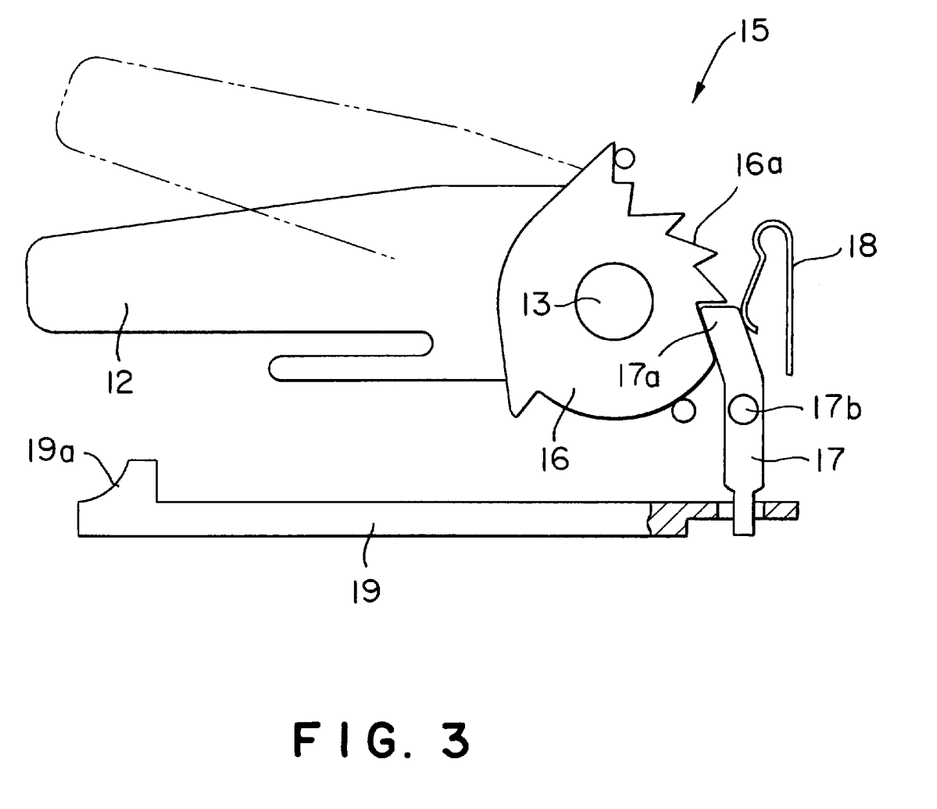
FIG. 3 is a partly sectional, schematic side elevational view of the locking mechanism included in the child car seat shown in FIG. 1.

When removing the child car seat from the passenger seat 7 of the vehicle, the lever 12 is unlocked by pulling the knob 19a of the operating rod 19 (FIGS. 2 and 3). Consequently, the seat belt 4 is relaxed. Then, the tongue plate 5 is disengaged from the latch 6, the seat belt 4 is separated from the seat belt fastening mechanism 20 and the child car seat is removed from the passenger seat 7 of the vehicle.

Thus, the seat belt 4 can be tightened by operating the lever 12 of the seat belt tightening mechanism 11 after the length of a section of the seat belt 4 has been fixed by the seat belt fastening mechanism 20. Therefore, the work for setting the child car seat on the passenger seat of the vehicle does not need to include the simultaneous performance of two actions for keeping the length of the seat belt fixed and tightening the seat belt. Consequently, the seat belt can be easily put on the child car seat and the seat belt used for fastening the child car seat to the passenger seat of the vehicle can be sufficiently tightened.

It is to be understood that the foregoing embodiment is only an example of the present invention and the present invention is not limited thereto in its practical application.

Figure 7:
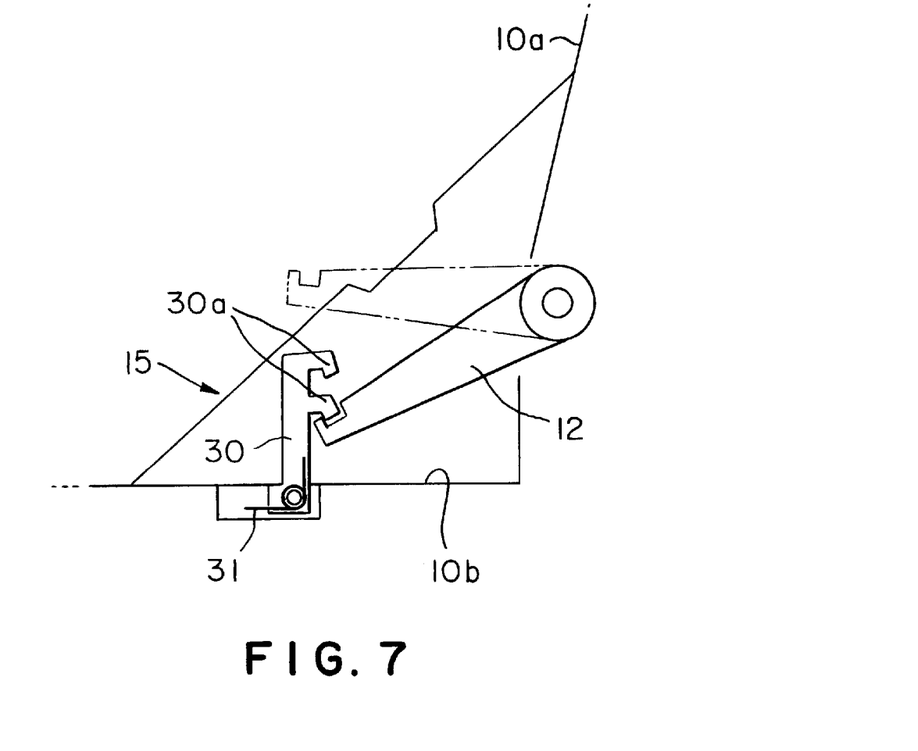
FIG. 7 is a schematic view of a modified locking mechanism included in the child car seat shown in FIG. 1.

For example, a locking mechanism 15 shown in FIG. 7 may be employed. This locking mechanism 15 has a locking lever 30 provided with a plurality of teeth 30a, having a base end pivotally supported on the bottom plate 10b of the base 10, and biased clockwise, as viewed in FIG. 7, by a spring 31. When tightening the seat belt 4, the lever 12 is turned counterclockwise, as viewed in FIG. 7, and the locking lever 30 is turned clockwise to engage a desired one of the teeth 30a of the locking lever 30 with the front end of the lever 12.

Figure 8:
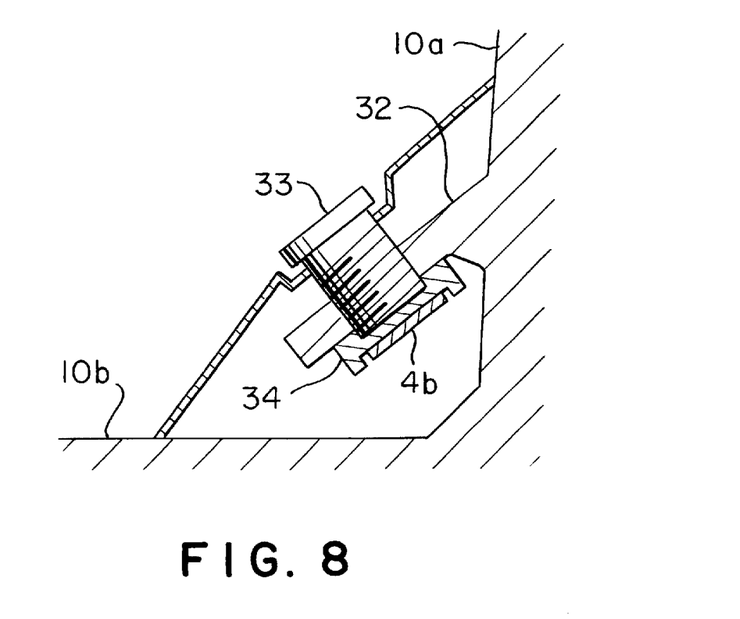
FIG. 8 is a schematic sectional view of a modified seat belt tightening mechanism included in the child car seat shown in FIG. 1.

As shown in FIG. 8, the lap section 4b of the seat belt 4 may be tightened by a seat belt tightening mechanism formed by projecting a support arm 32 provided with a threaded hole from the back plate 10a of the base 10, screwing a screw 33 in the threaded hole of the support arm 32 and rotatably connecting a belt holder 34 to the extremity of the screw 33. When tightening the lap section 4b of the seat belt 4, the lap section 4b is extended under the belt holder 34 and the screw 33 is propelled or turned in the threaded hole of the support arm 32 to deflect the lap section 4b by a desired distance so that the lap section 4b may be tightened. The threaded engagement between the screw 33 and the threaded hole in the support arm 32 is considered to be a locking mechanism, since this engagement allows the screw 33 to be maintained at one of a plurality of positions respectively corresponding to deflections of the lap section 4b of the seat belt 4.

What is claimed is:

1. A child car seat to be set and fixedly held on a passenger seat of a vehicle by a seat belt that extends between a retractor and a fixed member, comprising:
   a base to be set on the passenger seat;
   a seat belt fastening mechanism, supported on said base, for fastening a first portion of the seat belt so as to prevent the seat belt from being pulled from the retractor;
   a seat belt tightening mechanism, supported on said base, for tightening a second portion of the seat belt that extends between the fixed member and first portion of the seat belt when the first portion is fastened by said seat belt fastening mechanism, by deflecting the second portion of the seat belt toward the passenger seat when said base is on the passenger seat; and
   a locking mechanism to lock said seat belt tightening mechanism to maintain the second portion of the seat belt in a deflected condition that results from the second portion being deflected by said seat belt tightening mechanism,
   wherein said locking mechanism is adapted to lock the seat belt tightening mechanism at one of a plurality of positions that respectively correspond to deflections of the second portion of the seat belt as deflected by said seat belt tightening mechanism, and
   wherein said seat belt tightening mechanism includes a shaft supported on said base, and a lever having a base end supported by said shaft, with said seat belt tightening mechanism being adapted to tighten the second portion of the seat belt by deflecting the second portion of the seat belt in response to turning of said lever about said shaft such that the second portion of the seat belt is pushed by said lever.

2. A child car seat to be set and fixedly held on a passenger seat of a vehicle by a seat belt that extends between a retractor and a fixed member, comprising:
   a base to be set on the passenger seat;
   a seat belt fastening mechanism, supported on said base, for fastening a first portion of the seat belt so as to prevent the seat belt from being pulled from the retractor; and
   a seat belt tightening mechanism, supported on said base, for tightening a second portion of the seat belt that extends between the fixed member and first portion of the seat belt when the first portion is fastened by said seat belt fastening mechanism, by deflecting the second portion of the seat belt toward the passenger seat when said base is on the passenger seat,
   wherein said seat belt tightening mechanism includes a shaft supported on said base, and a lever having a base end supported by said shaft, with said seat belt tightening mechanism being adapted to tighten the second portion of the seat belt by deflecting the second portion of the seat belt in response to turning of said lever about said shaft such that the second portion of the seat belt is pushed by said lever.

3. A child car seat to be set and fixedly held on a passenger seat of a vehicle by a seat belt that extends between a retractor and a fixed member, comprising:
   a base to be set on the passenger seat;
   a seat belt fastening mechanism, supported on said base, for fastening a first portion of the seat belt so as to prevent the seat belt from being pulled from the retractor; and
   a seat belt tightening mechanism, supported on said base, for tightening a second portion of the seat belt that extends between the fixed member and first portion of the seat belt when the first portion is fastened by said seat belt fastening mechanism, by deflecting the second portion of the seat belt toward the passenger seat when said base is on the passenger seat,
   wherein said seat belt tightening mechanism includes a support arm projecting from said base, and a screw supported in said support arm, with said seat belt tightening mechanism being adapted to tighten the second portion of the seat belt by deflecting the second portion of the seat belt in response to turning of said screw such that the second portion of the seat belt is pushed by said screw.

4. A child car seat to be set and fixedly held on a passenger seat of a vehicle by a seat belt that extends between a retractor and a fixed member, comprising:
   a base to be set on the passenger seat;
   a seat belt fastening mechanism, supported on said base, for fastening a first portion of the seat belt so as to prevent the seat belt from being pulled from the retractor; and
   a seat belt tightening mechanism, supported on said base, for tightening a second portion of the seat belt that extends between the fixed member and first portion of the seat belt when the first portion is fastened by said seat belt fastening mechanism, by deflecting the second portion of the seat belt toward the passenger seat when said base is on the passenger seat,
   wherein said seat belt fastening mechanism is to fasten the first portion of the seat belt by fastening a diagonal section of the seat belt that extends from the retractor to a tongue plate that is latched at a predetermined position on the vehicle, and wherein said seat belt tightening mechanism is to tighten the second portion of the seat belt by tightening a lap section of the seat belt that extends from the tongue plate to the fixed member.

5. The child car seat according to claim 4, further comprising:
   a seat body to be set on said base; and
   a locking mechanism to lock said seat belt tightening mechanism to maintain the second portion of the seat belt in a deflected condition that results from the second portion being deflected by said seat belt tightening mechanism.

6. The child car seat according to claim 3, further comprising:
   a seat body to be set on said base; and
   a locking mechanism to lock said seat belt tightening mechanism to maintain the second portion of the seat belt in a deflected condition that results from the second portion being deflected by said seat belt tightening mechanism.

7. The child car seat according to claim 3, further comprising:
   a seat body to be set on said base,
   wherein said seat belt fastening mechanism includes a clip on said base, said clip being adapted to clip a portion of the seat belt.

8. The child car seat according to claim 7, wherein said seat belt fastening mechanism is to fasten the first portion of the seat belt by fastening a diagonal section of the seat belt that extends from the retractor to a tongue plate that is latched at a predetermined position on the vehicle, and wherein said seat belt tightening mechanism is to tighten the second portion of the seat belt by tightening a lap section of the seat belt that extends from the tongue plate to the fixed member.

9. The child car seat according to claim 2, further comprising:
   a seat body to be set on said base; and
   a locking mechanism to lock said seat belt tightening mechanism to maintain the second portion of the seat belt in a deflected condition that results from the second portion being deflected by said seat belt tightening mechanism.

10. The child car seat according to claim 9, wherein said seat belt fastening mechanism includes a clip on said base, said clip being adapted to clip a portion of the seat belt.

11. The child car seat according to claim 10, wherein said locking mechanism is adapted to lock the seat belt tightening mechanism at one of a plurality of positions that respectively correspond to deflections of the second portion of the seat belt as deflected by said seat belt tightening mechanism.

12. The child car seat according to claim 11, wherein said seat belt fastening mechanism is to fasten the first portion of the seat belt by fastening a diagonal section of the seat belt that extends from the retractor to a tongue plate that is latched at a predetermined position on the vehicle, and wherein said seat belt tightening mechanism is to tighten the second portion of the seat belt by tightening a lap section of the seat belt that extends from the tongue plate to the fixed member.

* * * * *